No. 828,105. PATENTED AUG. 7, 1906.
A. K. GILLESPIE.
CHEESE CUTTER.
APPLICATION FILED FEB. 23, 1906.
2 SHEETS—SHEET 1.
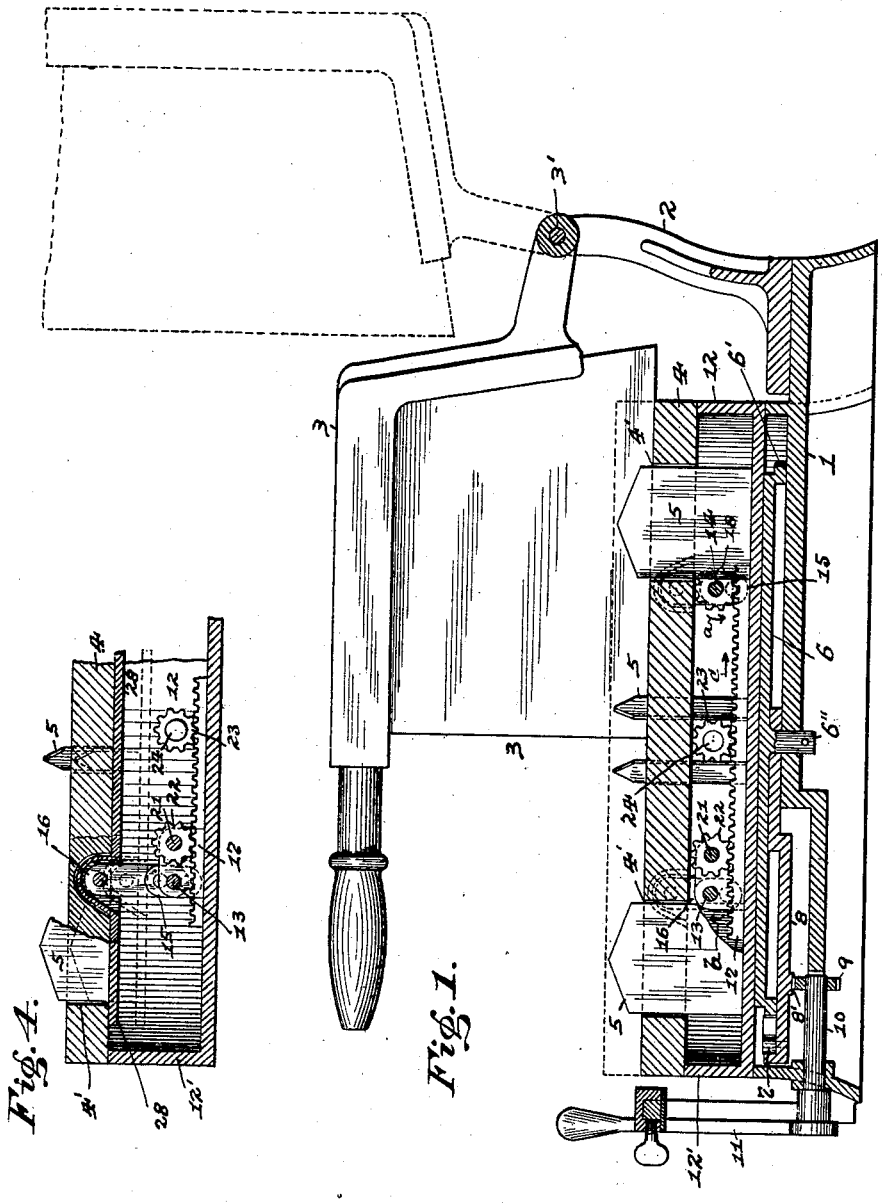
WITNESSES
INVENTOR
Alan K. Gillespie,
By J. N. Cooke,
Attorney.

No. 828,105. PATENTED AUG. 7, 1906.
A. K. GILLESPIE.
CHEESE CUTTER.
APPLICATION FILED FEB. 23, 1906.
2 SHEETS—SHEET 2.
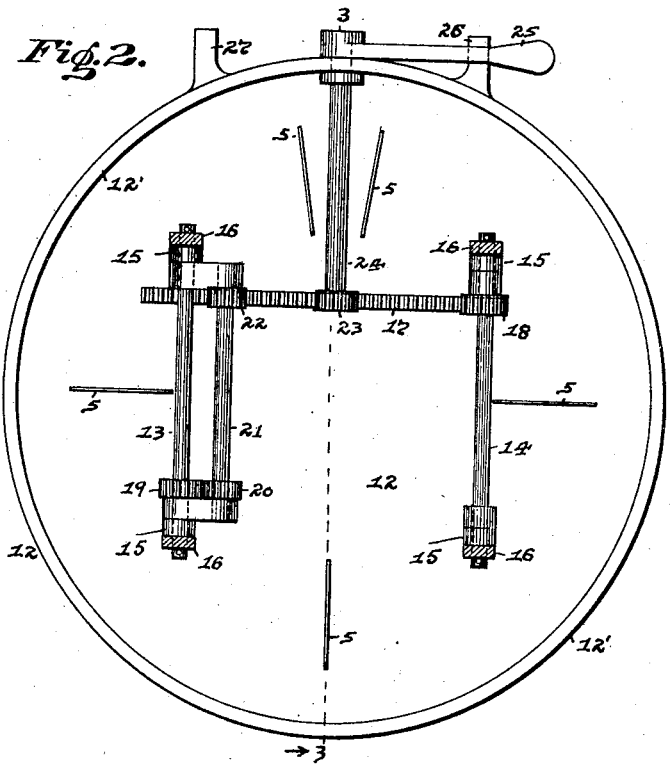
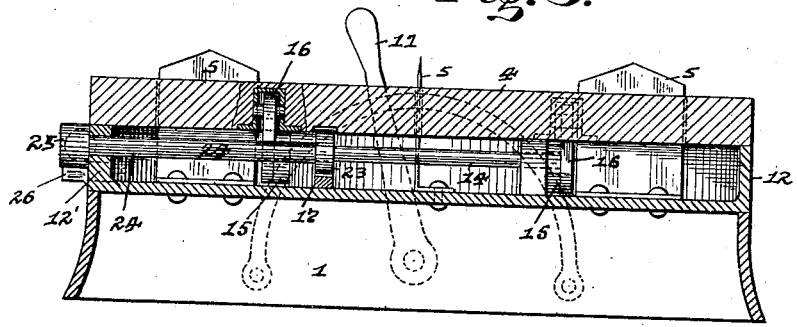
WITNESSES
INVENTOR
Alan K. Gillespie,
By J. N. Cooke,
Attorney.

UNITED STATES PATENT OFFICE.

ALAN K. GILLESPIE, OF PITTSBURG, PENNSYLVANIA.

CHEESE-CUTTER.

No. 828,105.

Specification of Letters Patent.

Patented Aug. 7, 1906.

Application filed February 23, 1906. Serial No. 302,368.

*To all whom it may concern:*

Be it known that I, ALAN K. GILLESPIE, a resident of Pittsburg, in the county of Allegheny and State of Pennsylvania, have invented a new and useful Improvement in Cheese-Cutters; and I do hereby declare the following to be a full, clear, and exact description thereof.

My invention relates to cheese-cutters, and has special reference to that class of cutters or machines in which the cheese to be cut is mounted on a rotatable table or board and is supported in position by means of radial spurs or knives projecting through the board.

The object of my invention is to provide a cheese-cutter having simple and efficient devices for enabling such spurs or knives to be held below the surface of the table or board at the time of placing the cheese in position upon said surface, so that such cheese can be quickly placed in a central position on said board and the said knives greatly facilitated in entering said cheese for the holding of the same.

My invention consists, generally stated, in the novel arrangement, construction, and combination of parts, as hereinafter more specifically set forth and described, and particularly pointed out in the claims.

To enable others skilled in the art to which my invention appertains to construct and use my improved cheese-cutter, I will describe the same more fully, referring to the accompanying drawings, in which—

Figure 1 is a vertical central section through the cutter. Fig. 2 is a top view of the cutter with the cheese-carrying board removed. Fig. 3 is a vertical central section of the same on the line 3 3, Fig. 2, taken at right angles to that shown in Fig. 2. Fig. 4 is a detail sectional view showing another form of the invention.

Like symbols of reference herein indicate like parts in each of the figures of the drawings.

In the ordinary or most approved form of this class of cheese-cutters the main frame or base of the device carried a cutting-knife from a side bracket on said frame, which knife is adapted to cut radial slices from any body of cheese placed upon a stationary supporting table or board, while projecting above such board are a series of stationary holding-knives which engage the cheese and such board and knives having a rotary motion imparted to them. In placing a cheese upon such a type of cutter the cheese is centered while being held at the top of the holding-knives by means of circular marks or a scale on the supporting-board and is then pressed down on the said knives, so by reason of the height of the cheese from the supporting-board and the sluing action of the cheese in being pressed down on the holding-knives the final position of the cheese often fails of being central, and in consequence equal movements of the lever for operating the board and knives in their movements fail to produce equal-sized slices of cheese throughout the circle of the same.

In my improved cheese-cutter 1 represents the main frame or base of the device, which carries from one side a bracket 2, having a cutting-knife 3, pivoted at 3' to the upper end thereof and being adapted when pressed down to cut radial slices from any body of cheese placed upon the supporting-board 4. Projecting above the board 4 are the spurs or holding-knives 5, which engage into the cheese and hold the same upon said board, the said board 4 and knives 5 having a rotary motion imparted to the same by means of a ring 6, centered by its pin 6'' in the frame 1 and having on its periphery teeth 6', which are engaged by pawls 7, carried on an arm 8, extending out from and around said pin 6'', while such arm is provided with a gear-rack 8' on its under side for being engaged by a pinion 9, operated through a shaft 10, journaled on said frame by a lever 11, connected to said shaft.

To overcome the difficulties and objections hereinbefore mentioned, there is provided an intermediate rotary and hollow member 12, to which the holding-knives 5 are secured, and such member is secured in any suitable manner to the ring 6. The board 4 rests upon the top edge of the flange 12' on the hollow member 12, and the holding-knives 5 are adapted to fit within slots 4', formed in said board, while journaled within and carried by said member 12 are the shafts 13 and 14 of the shaft and gearing mechanism for operating said board 4, which have at their ends the cranks 15 for operating the links 16, connected thereto at one end and to said board 4 in any suitable manner. The shaft 14 is operated in the direction indicated by the arrow *a* in Fig. 1 through a pinion 18 on said shaft engaging with a gear-rack 17 within the member 12, and the shaft 13 is operated in the direction indicated by the arrow $b$ in said figure through the pinion 19 on said shaft 13 engaging with a pinion 20 on an auxiliary shaft 21, running parallel with and between said shafts 13 and 14 and journaled in said member 12. A pinion 22 is mounted on the shaft 21 to engage with the rack 17, and such rack is operated in the direction of the arrow $c$ through a pinion 23, engaging with said rack and mounted on a shaft 24. The shaft 24 is turned by a handle 25, connected thereto, and which is adapted to engage with stops or lugs 25 and 26, formed on the hollow member 12.

When the handle 25 is in the position shown in Fig. 2 and against the lug 26, it will be evident that by throwing said handle through one hundred and eighty degrees from said lug 26 and against the lug 27 the shafts 13 and 14 will turn through the same degrees through the medium of the shafts 24 and 21, pinions 23, 22, and 18, engaging with the rack 17, and the pinions 19 and 20 on said shafts 13 and 21. This movement of these parts will permit the cranks 15 to move from the low to their high position, and thereby raise the board 4 through the links 16 and allow the upper surface of said board to be above the tops of the knives 5, thereby permitting said knives to disappear within said board, as indicated by dotted lines in Fig. 2. In this position of the cheese-board 4 the cheese can be placed very closely to a central position by means of the before-mentioned circular marks or scale (not shown) on the surface of the said board, while the throwing of the lever or handle 25 from the lug 27 to the lug 26 will cause a reverse movement of the shafts 13 and 14 through the other shafts, pinions, and rack before mentioned, so that the board 4 and cheese thereon will be lowered and the holding-knives 5 will emerge through said board and enter the cheese.

It will be evident that the outward motion of the cranks 15, as indicated by the arrows $a$ and $b$, produces a condition of equilibrium as regards the horizontal thrust of the said cranks during operation and, together with the guiding action of the knives 5, insures a vertical rise and fall of the board without any side or circular motion of said board.

In Fig. 4 there is an alternative construction shown in which the board 4 is stationary and the holding-knives 5 raised and lowered by the same mechanism as is described for raising and lowering the table, in which case said knives are mounted or secured upon a plate 28 in the member 12' and under said board instead of to said member, and the links 16 are connected to said plate instead of to said board.

Various other modifications and changes in the construction, design, and operation of the various parts of my improved cutter may be resorted to without departing from the spirit of the invention or sacrificing any of its advantages.

It will thus be seen that my improved cheese-cutter is composed of cheap and durable parts for the purpose for which it is intended and will be quick and positive in its operation and as to work performed. It is easily operated and will enable the cheese to be accurately centered for the cutting of the same in the required amounts, while at the same time few parts are added over the ordinary class of these cutters and it is not liable to get out of order.

What I claim as my invention, and desire to secure by Letters Patent, is—

1. In a cheese-cutter, the combination of a base, a rotary table, a rotary member between said base and table, spurs or holding-knives adapted to pass through slots in said table, and mechanism for causing said knives to disappear within said table.

2. In a cheese-cutter, the combination of a base, a rotary table, a rotary member between said base and table, spurs or holding-knives adapted to pass through slots in said table, and mechanism on said member for causing said knives to disappear within said table.

3. In a cheese-cutter, the combination of a base, a rotary table, a rotary member between said base and table, spurs or holding-knives adapted to pass through slots in said table, and crank-operating mechanism on said member for causing said knives to disappear within said table.

4. In a cheese-cutter, the combination of a base, a rotary table, a rotary member between said base and table, spurs or holding-knives adapted to pass through slots in said table, links connected to said table, cranks connected to said links, and mechanism on said member and connected to said cranks for causing said knives to disappear within said table.

5. In a cheese-cutter, the combination of a base, a rotary table, a rotary member between said base and table, spurs or holding-knives adapted to pass through slots in said table, links connected to said table, cranks connected to said links, and shaft and gearing mechanism on said member and connected to said cranks for causing said knives to disappear within said table.

6. In a cheese-cutter, the combination of a base, a rotary cutter, a rotary member between said base and table, spurs or holding-knives adapted to pass through slots in said table, links connected to said table, cranks connected to said links, shafts connected to said cranks, and a shaft and gearing mechanism on said member and connected to said crank-shafts for causing said knives to disappear within said table.

7. In a cheese-cutter, the combination of a base, a rotary table, a rotary member between said base and table, spurs or knives adapted to pass through slots in said table, links connected to said table, cranks connected to said links, shafts connected to said cranks, an auxiliary shaft, pinions connecting one of said crank-shafts with said auxiliary shaft, and shaft and gearing mechanism on said member and connected to the other one of said crank-shafts and to said auxiliary shaft for causing said knives to disappear within said table.

8. In a cheese-cutter, the combination of a base, a rotary table, a rotary member between said base and table, spurs or knives adapted to pass through slots in said table, links connected to said table, cranks connected to said links, shafts connected to said cranks, an auxiliary shaft, pinions connecting one of said crank-shafts with said auxiliary shaft, a gear-rack on said member, means for operating said rack and pinions engaging with said rack and with said auxiliary shaft and the other one of said crank-shafts for causing said knives to disappear within said table.

9. In a cheese-cutter, the combination of a base, a rotary table, a rotary member between said base and table, spurs or knives adapted to pass through slots in said table, links connected to said table, cranks connected to said links, shafts connected to said cranks, an auxiliary shaft, pinions connecting one of said crank-shafts with said auxiliary shaft, a gear-rack on said member, pinions engaging with said rack and with said auxiliary shaft and the other one of said crank-shafts, a pinion engaging with said rack and an operating-shaft connected to said pinion for causing said knives to disappear within said table.

In testimony whereof I, the said ALAN K. GILLESPIE, have hereunto set my hand.

ALAN K. GILLESPIE.

Witnesses:
J. L. TREFALLER, Jr.,
R. H. AXTHELM.